United States Patent [19]

Fisher et al.

[11] Patent Number: 5,440,478
[45] Date of Patent: Aug. 8, 1995

[54] PROCESS CONTROL METHOD FOR IMPROVING MANUFACTURING OPERATIONS

[75] Inventors: Gary Fisher, Mineral Ridge, Ohio; Mark Clark, II, Hermitage, Pa.

[73] Assignee: Mercer Forge Company, Mercer, Pa.

[21] Appl. No.: 199,056

[22] Filed: Feb. 22, 1994

[51] Int. Cl.⁶ .............................................. G05B 15/00
[52] U.S. Cl. ................................. 364/188; 364/468; 364/552; 364/554
[58] Field of Search ................... 364/148–194, 364/468–477, 496–503, 550–582

[56] References Cited

U.S. PATENT DOCUMENTS

| | | | |
|---|---|---|---|
| 4,858,154 | 8/1989 | Anderson et al. | 364/552 |
| 4,967,381 | 10/1990 | Lane et al. | 364/188 |
| 5,079,690 | 1/1992 | Li | 364/148 |
| 5,224,051 | 6/1993 | Johnson | 364/474.11 |
| 5,241,483 | 8/1993 | Porret et al. | 364/474.09 |
| 5,245,554 | 9/1993 | Tsuyama et al. | 364/552 |
| 5,257,206 | 10/1993 | Hanson | 364/148 |
| 5,311,759 | 5/1994 | Mangrulkar et al. | 364/552 |

*Primary Examiner*—James P. Trammell
*Attorney, Agent, or Firm*—Buchanan Ingersoll; Lynn J. Alstadt

[57] ABSTRACT

In a method and system for controlling a manufacturing process statistical process control data or other statistical indicators of performance from the production process and specification data are displayed in both tables and bar-type graphs. The graphic display enables the production manager to easily see both out of specification activity and trends so that he can adjust the manufacturing process accordingly before the production run is completed.

16 Claims, 4 Drawing Sheets

*Fig. 4.*

COMPANY NAME - QUALITY CONTROL DEPARTMENT

DATE OF REPORT

JOB INFO
- JOB NUMBER : 1450
- CHAR CODE : SH
- CHAR DESC : SHUT HEIGHT
- CUST PART# : Y23-B-099
- PART DESC : GEAR
- CUSTOMER :

TOLERANCES
- MAX - 0.9400
- NOM - 0.9100
- MIN - 0.8800

CONTROL LIMITS
- $UCL_x$ - 0.9273
- $LCL_x$ - 0.9118
- $UCL_r$ - 0.0195
- $LCL_r$ - 0.0000

| PRESS | DATE | AVERAGE | R BAR | SIGMA | CP | CPK | SMP. |
|---|---|---|---|---|---|---|---|
| 6 | 03/10/1994 | 0.9010 | 0.0083 | 0.0049 | 2.0316 | 1.4221 | 9 |
| 5 | 02/27/1994 | 0.9150 | 0.0052 | 0.0031 | 3.2558 | 2.7131 | 15 |
| 5 | 02/15/1994 | 0.9145 | 0.0078 | 0.0046 | 2.1613 | 1.8371 | 18 |
| 5 | 01/25/1994 | 0.9168 | 0.0040 | 0.0024 | 4.2325 | 3.2731 | 15 |
| 6 | 01/10/1994 | 0.9144 | 0.0091 | 0.0054 | 1.8553 | 1.5822 | 24 |
| 5 | 12/30/1993 | 0.9058 | 0.0093 | 0.0055 | 1.8139 | 1.5586 | 18 |
| 5 | 12/21/1993 | 0.9207 | 0.0062 | 0.0037 | 2.7187 | 1.7520 | 66 |
| 5 | 11/17/1993 | 0.9179 | 0.0063 | 0.0037 | 2.6860 | 1.9770 | 99 |
| 6 | 10/15/1993 | 0.9229 | 0.0095 | 0.0056 | 1.7789 | 1.0126 | 66 |
| 6 | 09/22/1993 | 0.9211 | 0.0114 | 0.0067 | 1.4890 | 0.9405 | 60 |
| 5 | 08/11/1993 | 0.9245 | 0.0066 | 0.0039 | 2.5681 | 1.3292 | 93 |
| 5 | 07/29/1993 | 0.9214 | 0.0059 | 0.0035 | 2.8698 | 1.7750 | 27 |
|   | CUMULATIVE | 0.9195 | 0.0076 | 0.0045 | 2.2398 | 1.5274 | 510 |

CPK CHART
XCTRL LMTS
P

| P | Date |
|---|---|
| 6 | 03/10/1994 |
| 5 | 02/27/1994 |
| 5 | 02/15/1994 |
| 5 | 01/25/1994 |
| 6 | 01/10/1994 |
| 5 | 12/30/1993 |
| 5 | 12/21/1993 |
| 5 | 11/17/1993 |
| 6 | 10/15/1993 |
| 6 | 09/22/1993 |
| 5 | 08/11/1993 |
| 5 | 07/29/1993 |
|   | CUMULATIVE |

PROCESS CONTROL METHOD FOR IMPROVING MANUFACTURING OPERATIONS

FIELD OF THE INVENTION

The invention relates to a method to improving manufacturing operations using an improved statistical process control technique.

BACKGROUND OF THE INVENTION

In many manufacturing processes parts or compositions of matter are made which are required to fall within certain specifications. The specifications state the important features or characteristics required to produce a product of a desired quality. Those specifications typically state dimensions of a product or elements of a composition, but could also be physical or chemical properties. Each characteristic has a nominal value corresponding to the preferred value of the specified characteristic. Nearly always, a product having the specified characteristic within a certain range or tolerances of the nominal value is considered acceptable.

In order to assure that products fall within specifications, manufacturers typically take samples from the production line which are analyzed by quality control inspectors. The number of samples taken and when they are taken are usually specified by the manufacturer based upon known statistical sampling techniques or past manufacturing experience.

Should the quality control inspector analyze a sample and find that a particular characteristic is outside the specified tolerance limits he will normally shut the manufacturing line down, and make the necessary corrections to bring the product within the specification. However, in the event that the inspector finds that all characteristics of the sample are within the tolerances specified for the product, he will simply note his findings in a log and allow the manufacturing process to continue to run. This data could also be entered into a computer database. Conventionally, the data has also been reproduced in tables or graphs which are almost always created after completion of the production run. Sometimes average values and standard deviations are computed and displayed in tables or graphs. Prior to the present invention the graphs have been either standard plots of datapoints on an x, y coordinate or histograms.

Even though all of the samples taken by the quality control inspector are within the tolerance levels specified, that is no guarantee that every product manufactured over a production run will be within the specified tolerance limits. Edward Demming and its followers have developed a technique known as statistical process control, or SPC, which applies certain equations to the readings taken by the quality control inspector. Statistical process control generates a set of numbers conventionally identified by various letters or letter combinations as follows:

x is a single reading or value
x̄ is an average of readings within a cell.
$X_{avg}$ is an average of all readings.

$$X_{avg} = \frac{x_1 + x_2 + \ldots + x_k}{k}$$

R (Range) is the difference between readings within a cell or between cells.
$\bar{R}$ is the average of all ranges.

$$\bar{R} = \frac{R_1 + R_2 + \ldots + R_k}{k}$$

σ (sigma) is the standard deviation of the distribution of individual values of a process characteristic.

$$\sigma = \frac{\bar{R}}{D_2}$$

$D_2 = 1.13$ For Individuals
$D_2 = 1.69$ For Sample of 3

USL is the abbreviation for upper spec limit.
LSL is the abbreviation for lower spec limit.
C/L control limits (upper & lower) are lines on a control chart used for a basis for judging a process.

$$UCL \times = X_{avg} + (A_2 \bar{R})$$

$$LCL \times = X_{avg} - (A_2 \bar{R})$$

where $E_2$ is a constant corresponding to sample size such as 2.66 for a single sample and 1.77 if the sample size is three.

$$UCL_R = D_4 \bar{R} \text{—specify betw. } R, \bar{R}$$

where $D_4$ is a constant corresponding to sample size which constant for a single sample is 3.27 and for sample size of 3 is 2.57.

cp is the inherent capability of a process in relationship to the tolerance.

$$Cp = \frac{\text{Tolerance}}{6\sigma}$$

CpK is the inherent capability in relationship to specification mean. (Most always be viewed from worst case).

$$CpK = \frac{(USL - X_{avg})}{3\sigma} \text{ or } \frac{(X_{avg} - LSL)}{3\sigma}$$

Persons familiar with SPC can use the various statistical results to predict the probably that a product made during a given production run will be outside the accepted tolerances specified for the product. Consequently, many purchasers now require their suppliers to provide statistical process control numbers for each production run or shipment. Additionally, many manufacturers maintain records of these numbers. Several people have attempted to use this historical data to identify trends or to look for standard or recurring values which could indicate either normal operation or particular problems in the manufacturing process. Unfortunately, the volume of data and the manner in which it has been presented and stored have overwhelmed most production managers. Consequently, they have not been able to achieve their objectives. Moreover, prior to the present method statistical process control data has been difficult to use during the production run resulting in a lack of use by most manufacturers during the manufacturing process.

The data collected by the quality control inspectors is often entered into database programs to which various statistical programs can be applied. However, none of these programs have provided much meaningful information to the production manager. Sometimes the inspectors also will graph the data they collect to look for any trends. However, because of the huge amount of data generated during even a single production run, graphs made of that data tend to be too voluminous to be subject to easy comparison. The numbers themselves are even more difficult to analyze. Moreover, when one considers multiple production runs over several days, weeks or months the volume of data is so large that meaningful analyses have not been made. Historical data has not been used to much extent to improve or control subsequent similar production runs or to establish standard values which correspond to normal operation. Consequently, there is need for methods which utilize statistical process control during the manufacturing operation to maintain and improve product quality.

SUMMARY OF THE INVENTION

We provide a method of manufacture wherein statistical process control (SPC) numbers, or other statistical indicators of performance, are calculated from information recorded by quality control inspectors. The results of the SPC calculation for a selected set of samples, such as those from a production run or a shift, are displayed in graphic form. The graph comprises an initial line showing specified tolerances below which are reported graphic representations of the SPC data per set of samples along with a cumulative total of all SPC data or a segment of that data pertaining to the product being manufactured. The graphs are calculated on a real time basis during the production process and are available to the operators of the manufacturing equipment or the manager of manufacturing department. The cumulative total will enable the manager or operator to see the region of normal production for a particular product on a particular production line. The display of historical data may reveal to the manager trends developing which could be associated with equipment wear or other problems thereby enabling the manager to correct the problem during normal maintenance periods. Consequently, less scrap will be produced and interruptions of the production run will be minimized.

Other objects and advantages of the present invention will become apparent from a description of the present preferred embodiments of the method illustrated by the drawings.

BRIEF DESCRIPTION OF THE FIGURES

FIG. 4 is a report similar to that shown in FIGS. 2 and 3 containing both historical and current data.

DESCRIPTION OF THE PREFERRED EMBODIMENTS

Figure 1:
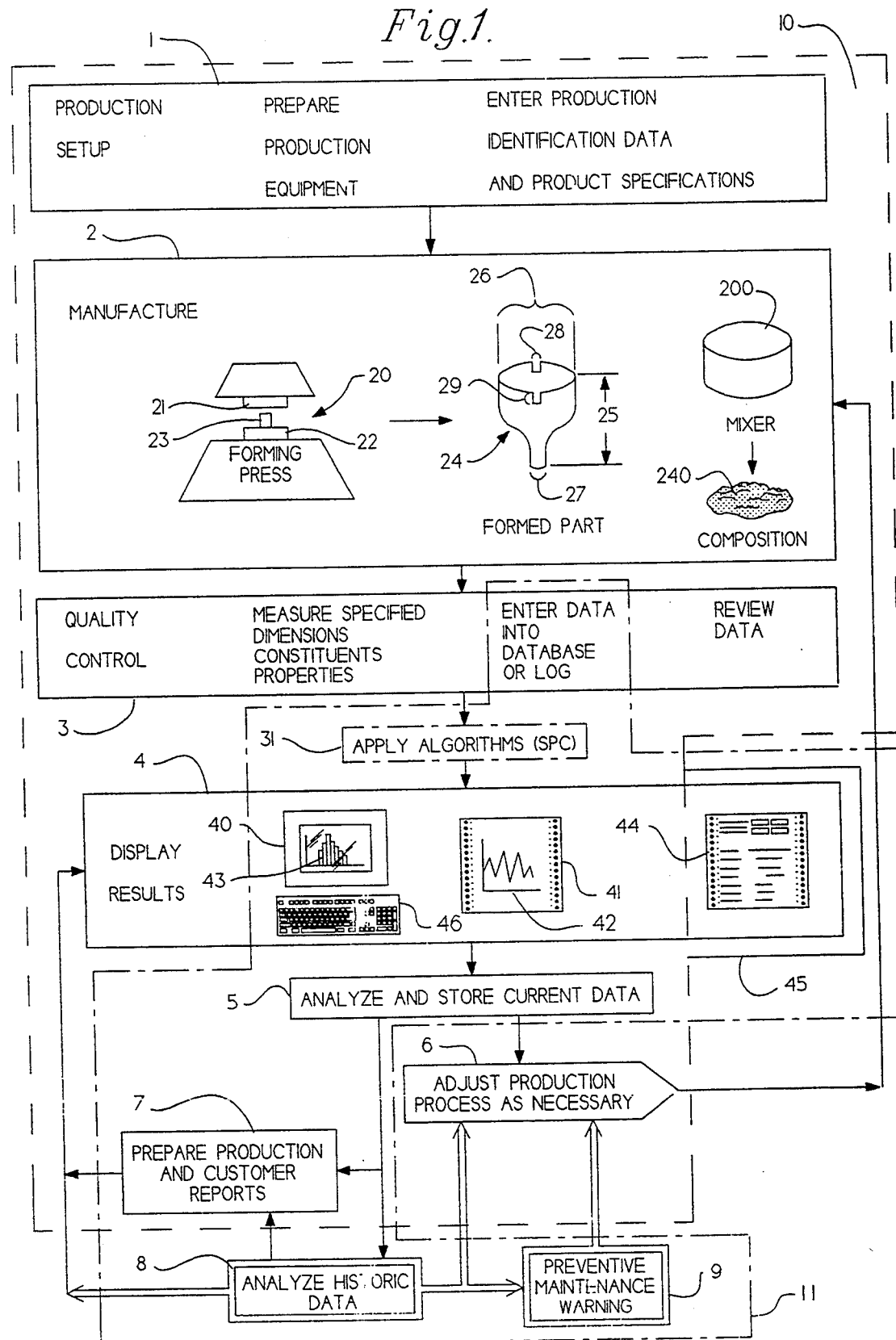
FIG. 1 is a block diagram of a production and quality control process wherein certain new features enabled by the present method are indicated by double lined blocks and arrows.

As illustrated by the block diagram of FIG. 1, a normal production process includes a product set-up step indicated by block 1, manufacturing steps indicated by block 2 and quality control indicated by block 3. The set-up procedure usually encompasses preparation of the production equipment and the entering of production identification and product specifications into logs or into databases which will be used during and after the production process. The manufacturing stage may involve the creation of a part such as part 24 on a forming press 20. That part could be a finished product or a product preform. The particular part 24 shown in block 2 is made by cold forming a slug of metal 23 between dies 21, 22. The finished part 24 will have a selected shape as shown in the figure. With respect to that part there may be various dimensions identified by numbers 25 thru 29 which are specified. Such dimensions may include the height 25, major diameter 26, and minor diameter 27 of the basic part along with the height 29 and width 28 of the slots. The manufacturing process can also involve the creation of a composition of matter 240 made by mixing components in a mixing chamber 200. The mixing chamber could be anything from a furnace used to make metal alloys to a mechanical mixer used for making a variety of products ranging from foods to paper and plastics.

Quality control will typically involve the measurement of specified dimensions or constituent components, entry of the data into a database or log and review of the data. For some products the measurements may also be of specified chemical or physical properties such as weight or tensile strength. Sometimes algorithms will be applied to the data as indicated by box 31. The algorithms may range from simple averaging to sophisticated statistical methods such as statistical process control (SPC). Frequently, the data will be displayed on a computer terminal 40 or paper 41. Conventionally, the displays have taken the form of either tables, histograms 43 or x,y coordinate graphs 42 of data points. Often the analyst is simply looking to see whether the values are in the specified range. Paper logs may be used to store the data or the data could be stored on disks or other computer media.

The data analysis and display steps are preferably performed by a personal computer indicated by box 11. The computer will have a keyboard 46 or other data entry means for entering data, a data display means such as CRT 40, a central processor and memory. The memory will contain a program for analyzing and displaying the data in the form shown in FIGS. 2 thru 4.

In the event that the measurements reveal the product to be outside the specifications it will be necessary to adjust the production process as indicated by block 6. Then, the manufacturing process is resumed and quality control, display, analysis and storage of the data are performed. On occasion, as indicated by block 7, the manufacturer will be required to prepare particular production reports or reports requested by the customer. Typically, the report will be displayed in some form, usually on paper, and analyzed and stored by the manufacturer or the customer. Preparation of the report and data analysis have traditionally been done after completion of the job or production run.

Prior to the present invention it was not possible to maintain meaningful, historic analysis of manufacturing process data. However, the present method enables the manager to do that as indicated by block 8. Such historic analysis could be displayed, be used to adjust the production process or provide a preventative maintenance warning 9. Since all of the features of production setup, manufacture, quality control, display, analysis, storage, adjustment and preparation of reports has been known in the art, these steps have been grouped together within box 10 shown in dotted line. What the prior art has not done, however, is the generation of a report 44 of the type shown in FIGS. 2 thru 4 and indicated in a portion of box 4 encircled by double line 45. This report can be generated using a personal computer programmed to perform conventional SPC or other calculations and display the data in the manner shown in FIGS. 2 thru 4. Because this display of data is easy to read, it is useful during the production process. Indeed, the production manager is able to achieve increases in productivity from his production personnel while simultaneously adjusting the production process for continual quality improvements. The program is valuable for managers of quality organizations and upper level management because for the first time it provides managers the information they need to control quality during the production process without burdening them with hours of reading boring statistics.

The display 44 can be compared to the difference between the graphic representation of a road atlas to the written text of the same information. Obviously by scanning a map one can visualize his position relative to his destination much easier than he can by reading words and numbers.

Our display 44 contains much of the conventional numerical data from SPC or other statistical analysis, but also provides a graphic representation of this data. The method can be used for any number of samples and for any accepted statistical quality control practices. Typically, these practices will create values for average, sigma, CPK and CP.

Figure 2:
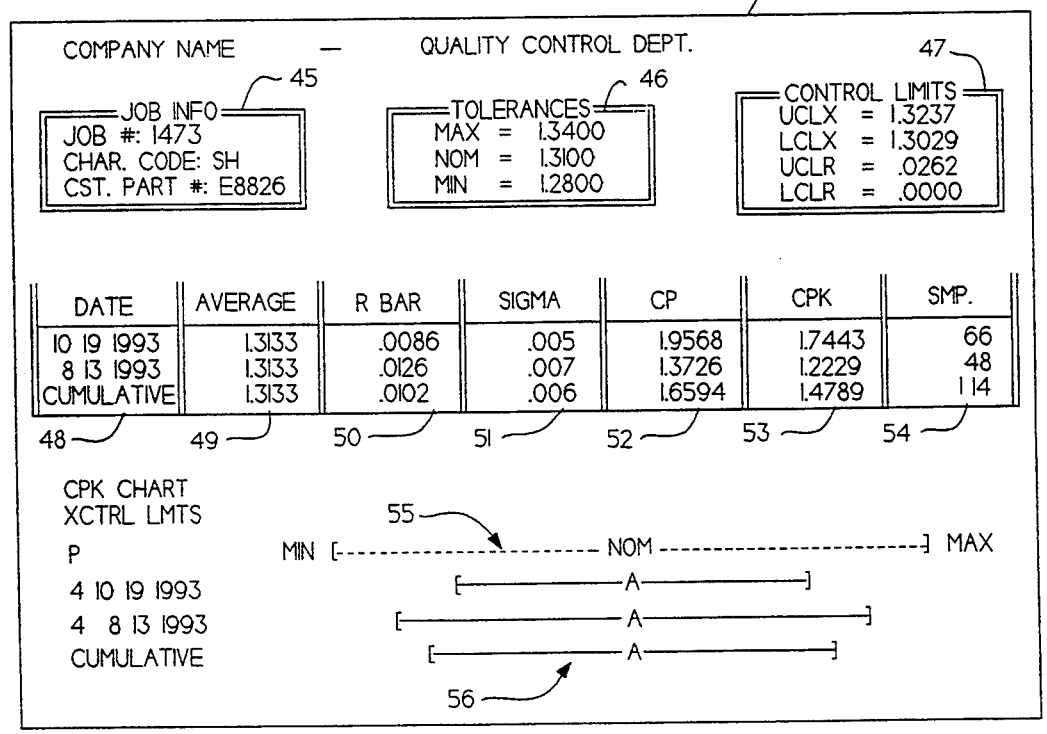
FIG. 2 is a present preferred display of data relating to a particular product specification collected and analyzed over a given production run.
Figure 3:
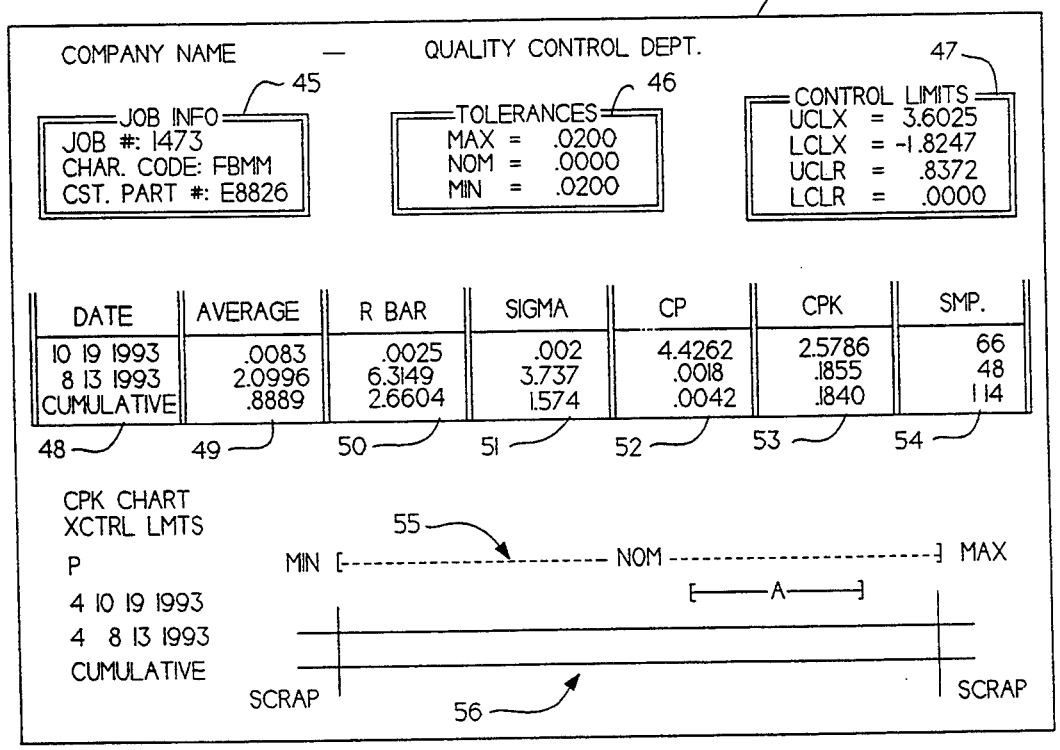
FIG. 3 is a display similar to FIG. 2 for a different specification for the same product and production period.

Turning to FIGS. 2 and 3, our report preferably provides the company name and identification of the report as being generated by the quality control department at the top of the page. There is a box 45 containing job information. It preferably includes the job number. The report could also identify the production crew or equipment used to produce the product. We have been able to monitor die wear by tracking the dies, by die number, used in the press or other equipment used form the particular part. The second line identifies the particular characteristic of the part which is being displayed in this report and also contains an identification of a particular part by customer part number. All of these lines could contain both alpha and numeric information. The job information could be expanded to include customer name, customer codes or other pertinent information. Box 46 reports the nominal value and maximum and minimum acceptable values for the particular characteristic under the heading "Tolerances". Box 47 reports the upper and lower control limits. On the next portion of the graph there is a box for the dates of the particular production runs or sample sets and cumulative totals for the subsequent data provided in adjacent boxes. Although there are only two dates listed in box 48, we are able to display any number of dates and a cumulative line in these boxes. We prefer to display up to 12 dates and a cumulative line 56. Twelve lines of data can be shown both in tables and graphically in the lower portion of the chart and fit on one graph and table and be printed on one 8 ½ × 10 page. Six lines of data and a cumulative line can be printed in tubular or graphic form on a single sheet, Box 49 reports the average of the values for the particular days and a cumulative value. The next box 50 reports the R bar values obtained from the statistical program followed by sigma in box 51, CP in box 52 and CPK in box 53. We prefer that the right most box 54 list the number of samples which were used to generate the data for that particular line. The tables may also include other characteristic fields.

Below the tabular information we provide a bar type graph. The first line 55 is a graphic display of the nominal value, minimum and maximum of the tolerance levels. On the left hand side of that line there is an identification of that graph. The notation "CPK chart × ctrl lmts" is just a title for the chart. It will most efficiently indicate that the subsequent lines report CPK values extended to the upper and lower control limits. Below the line indicating the tolerances there are lines corresponding to the CPK value and control limits for each of the dates listed in the left hand side. The entries adjacent the date under the letter "P" identify the equipment, here the press number, used to make the product. Instead of date information, one could also report by production run, production shift or other convenient measure of time. To the right of each date is a line showing the average value and the outer limits calculated using the particular statistical process technique. For this graph these are SPC values. In looking at the graph one can readily see that all of the samples were within the specified range. Hence, the production quality should be acceptable.

FIG. 3 is a similar presentation for a different specified characteristic. Hence, the entries are identified by the same numbers used in FIG. 2. Here the first production run is within the specified range; but the second run exceeds the maximum and minimum. Thus, a portion of those samples and corresponding production run must be destroyed or reworked. That portion may optionally be identified on the report by the word "scrap" or other designation as shown in FIG. 3. The present display provides real time information on the production process which can be used to adjust the process before significant scrap or major production problems have occurred. If a production manager sees this information during a production run he can immediately take the necessary steps to correct any problems which have developed in the process.

The particular changes which must be made in the production process will depend upon the nature of the process and the part being produced. For example, if one is manufacturing a part by a stamping process and discovers that the dimensions are exceeding the specified maximum, that could indicate that die wear has occurred. Thus, the manager could direct the operator to insert a new die into the press. The old die could then be scrapped or reworked to bring it back to specification.

This data could also indicate other problems such as that the process is operating at the wrong speed or wrong temperature or perhaps that there is a mechanical part failing within the press or other equipment.

Another advantage of our invention is that the production values for each run are totalled giving a cumulative value. Thus, over time the cumulative value may provide an indication of normal operation. Moreover, one can see trends developing when the data for a series of dates or runs is moving to the left or right of the cumulative value. That fact could be an indicator of a production problem. In FIG. 4 we show a graph in which there is a trend of the values moving from the nominal to the maximum. That could be an indicator of die wear. consequently, the production manager can replace the die before parts are manufactured which are out of specification. The report could include a line labeled "Normal." This line was generated using data from several production runs on the same equipment to make the same product over time. It was independently calculated from historic data, stored in the computer and applied to all graphs. For many applications the cumulative line will serve as the "Normal" line.

As previously mentioned we have found that 6 or 12 data lines and a cumulative data line can be provided on one or two sheets respectively. Consequently, we prefer to maintain a rolling report of data such that when the 7th or 13th line of data is generated, the first line is removed and the remaining lines are moved up. The cumulative line preferably is a total of only the data appearing in the report. However, we could use all collected data to create the cumulative line, or display two cumulative lines. One line would result from only the data on the report. The second line would include that data as well as previously collected data.

We also prefer to sort the collected data across some or all of the characteristic fields which appear in boxes 45 and 48 thru 54. The sorted data could then be presented in tables, graphs or other types of reports. This enables further understanding and control of the production process. For instance, if a manager wanted to know the capability of a press for controlling thickness of not just one part number, but of all parts made on the press of many configurations he could now find this information.

This data can provide an indication of the process's performance deviating from the norm. This could indicate that the press is worn out. Such information can also be used by the salesmen or engineers to answer questions from customers. For example, if a customer was concerned about whether a supplier could hold a 0.030 thickness tolerance the salesman could show the customer a report for the press which would be used. If the report showed the press holding 0.015 the customer would be satisfied.

The inverse could also be true. A salesman who has reviewed our reports would not commit to a customer that his company could hold a 0.010 thickness if the report for the production equipment demonstrates a capability of 0.015. In this way bas customer relations and potential scrap problems are averted.

The art has developed many algorithms for determining statistical measures of performance. Those methods range from simple averaging to creation of statistical values like sigma ($\sigma$). Although we have described the use of averaging and sigma, the statistical process control algorithms which may be used in our method are not limited to these procedures. Any algorithm which provides a measure of performance may be used.

it should be distinctly understood that the present invention is not limited to the preferred methods described, but can be variously embodied within the scope of the following claims.

We claim:

1. A method for controlling a manufacturing process which produces a product comprising the steps of
    a. establishing at least one specification for the product which specification defines one of a specification nominal value with tolerances and a range, and has a corresponding specification plot line;
    b. taking samples of the product during...a plurality of time periods;
    c. measuring the samples relative to the specification to create at least one measurement for each sample;
    d. recording the measurements and corresponding time period for each sample in a database;
    e. applying for a plurality of time periods at least one statistical process control algorithm to at least one selected set of sample measurements from that time period to define for that set of sample measurements and time period at least one statistical value with an associated sample plot line reflecting a statistical representation of the set of sample measurements;
    f. graphically displaying in a bar type graph the specification plot line adjacent sample plot lines from the plurality of time periods for which the statistical process control algorithm has been applied; and
    g. adjusting the manufacturing process as necessary in response to the bar type graph, wherein steps b thru f are performed during at least one of a setup run and a manufacturing run.

2. The method of claim 1 wherein there are a plurality of specifications, each specification corresponding to a dimension of the product.

3. The method of claim 2 wherein steps b thru f are performed for each specification.

4. The method of claim 1 wherein the product is a composition of matter and there are a plurality of specifications, each specification corresponding to an element in the composition.

5. The method of claim 4 wherein steps b thru f are performed for each specification.

6. The method of claim 1 wherein the manufacturing process includes a step of forming one of the product and a product preform in one of a mold and a die and the step of adjusting the manufacturing process is modifying one of the die and the mold.

7. The method of claim 1 wherein the production process is performed over several shifts and the time period is a shift, steps b thru e are performed for each shift to generate for each shift at least one of at least one sample statistical value and associated sample plot line and also comprising the step of displaying the selected sample average value and associated sample plot lines from a plurality of shifts.

8. The method of claim 7 also comprising the steps of:
    a. combining the selected sample average value and associated sample plot lines to form a cumulative value and associated cumulative plot line; and
    b. displaying the cumulative value and associated cumulative plot line in the bar type graph.

9. The method of claim 1 also comprising the step of displaying with the bar type graph characteristic fields containing at least one of a date associated with each sample plot line, customer information, production equipment information, numerical values for the specification, nominal value and tolerances, control limits, at least one average value of a set of sample measurements, sample numbers, measures of statistical significance, and user code.

10. The method of claim 9 also comprising the steps of:
    a. sorting by characteristic fields to create sorted data;
    b. selecting a portion of the sorted data; and
    c. displaying a selected portion of the sorted data.

11. The method of claim 1 wherein the step of applying a statistical process control algorithm and graphically displaying a bar type graph are performed by a computer.

12. A system for monitoring a production process which produces a product during a plurality of time intervals that meets predetermined specifications comprising:

a. a central processing unit;

b. data input means connected to the central processing unit;

c. a display means connected to the central processing unit which is capable of displaying tables containing alphanumeric characters and a bar type graph containing a set of substantially parallel lines below the tables; and d. a memory connected to the processing unit, the memory capable of storing data for each time period received from the data input means and containing a program for:

i) displaying in tabular form selected data received from the data input means, ii) applying at least one statistical process control algorithm to at least a portion of the selected data which is displayed in tabular form to create at least one statistical value with an associated plot line for each time period reflecting a statistical representation of the portion of the selected data for that time period;

iii) creating a specification plot line corresponding to at least one specification entered through the data input means; and iv) causing the display means to display in tabular form selected specifications, selected manufacturing data, and selected statistical values and to display near the tabular form a bar-type graph containing plot lines from a plurality of time periods and a specification plot line, the plot lines being displayed substantially parallel to one another.

13. The system of claim 12 wherein the data input means is a keyboard.

14. The system of claim 12 wherein the system is a personal computer.

15. The system of claim 12 wherein the memory contains a program for combining selected sets of data entered through the data input means to form an average value and associated average plot line for each set wherein each set of data contains values corresponding to a group of samples taken from a production process such that the average value for each set is displayed in the tabular form and the average plot line for each set is displayed substantially parallel to the specification plot line.

16. The system of claim 15 wherein the memory contains a program for creating and displaying cumulative values and a cumulative plot line.

* * * * *